(12) United States Patent
Sarshar et al.

(10) Patent No.: US 6,572,115 B1
(45) Date of Patent: Jun. 3, 2003

(54) ACTUATING SEAL FOR A ROTARY MACHINE AND METHOD OF RETROFITTING

(75) Inventors: Hamid Reza Sarshar, Clifton Park, NY (US); Norman Arnold Turnquist, Sloansville, NY (US); Biao Fang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/683,406

(22) Filed: Dec. 21, 2001

(51) Int. Cl.[7] .............................................. F16J 15/447
(52) U.S. Cl. ..................... 277/412; 277/413; 277/416
(58) Field of Search ................................ 277/412, 413, 277/416, 421, 422, 355

(56) References Cited

U.S. PATENT DOCUMENTS

| | | | | |
|---|---|---|---|---|
| 3,971,563 A | * | 7/1976 | Sugimura | 277/413 |
| 4,017,088 A | * | 4/1977 | Lerjen | 277/416 |
| 5,464,226 A | * | 11/1995 | Dalton | 277/412 |
| 5,547,340 A | * | 8/1996 | Dalton et al. | 415/121.2 |
| 5,603,510 A | * | 2/1997 | Sanders | 277/413 |
| 5,700,011 A | * | 12/1997 | Bainachi et al. | 277/422 |
| 5,810,365 A | * | 9/1998 | Brandon et al. | 277/416 |
| 5,971,400 A | * | 10/1999 | Turnquist et al. | 277/416 |
| 6,050,081 A | | 4/2000 | Jansen et al. | |
| 6,065,754 A | * | 5/2000 | Cromer et al. | 277/412 |
| 6,105,967 A | * | 8/2000 | Turnquist et al. | 277/355 |

* cited by examiner

*Primary Examiner*—William L. Miller
(74) *Attorney, Agent, or Firm*—Patrick K. Patnode; Christian G. Cabou

(57) ABSTRACT

A seal assembly is provided for a rotary machine wherein the rotary machine comprises a rotor and a casing. The rotor comprises a generally longitudinally-extending axis. The casing is generally coaxially aligned with the axis. The casing circumferentially surrounds, is radially spaced apart from the rotor, and comprises an inner circumferential channel generally coaxially aligned with the rotor. The seal assembly comprises a plurality of seal carrier segments fixedly disposed in a circumferential array in the inner circumferential channel. Each of the seal carrier segments comprises a seal carrier channel. At least one of the seal carrier segments comprises at least one fluid inlet disposed therein. In addition, the seal assembly comprises a (meaning at least one) seal disposed in the seal carrier channel and is movable between radially inward and radially outward positions upon introduction of fluid medium in the fluid inlet.

27 Claims, 4 Drawing Sheets

ACTUATING SEAL FOR A ROTARY MACHINE AND METHOD OF RETROFITTING

BACKGROUND OF INVENTION

The present invention relates generally to rotary machines, and more particularly to actuated seals for rotary machines such as steam and gas turbines.

Rotary machines include, without limitation, turbines for steam turbines and compressors and turbines for gas turbines. A steam turbine has a steam path that typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, a gas path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known in the art of steam turbines to position, singly or in combination, variable clearance labyrinth-seal segments and brush seals in a circumferential array between the rotor of the turbine and the circumferentially surrounding casing to minimize steam-path leakage. Springs hold the segments radially inward against surfaces on the casing that establish radial clearance between seal and rotor but allow segments to move radially outward in the event of rotor contact. While labyrinth seals, singly or in combination with brush seals, have proved to be quite reliable, labyrinth seal performance degrades over time as a result of transient events in which the stationary and rotating components interfere, rubbing the labyrinth teeth into a "mushroom" profile and opening the seal clearance.

Accordingly, there is a need in the art for a rotary machine having improved leakage control between stationary and rotating components.

SUMMARY OF INVENTION

The present invention relates generally to rotary machines, and more particularly to actuated seals for rotary machines such as steam and gas turbines.

Rotary machines include, without limitation, turbines for steam turbines and compressors and turbines for gas turbines. A steam turbine has a steam path that typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, a gas path leakage in the turbine or compressor area of a gas turbine, between the rotor of the turbine or compressor and the circumferentially surrounding turbine or compressor casing, will lower the efficiency of the gas turbine leading to increased fuel costs. Also, steam-path leakage in the turbine area of a steam turbine, between the rotor of the turbine and the circumferentially surrounding casing, will lower the efficiency of the steam turbine leading to increased fuel costs.

It is known in the art of steam turbines to position, singly or in combination, variable clearance labyrinth-seal segments and brush seals in a circumferential array between the rotor of the turbine and the circumferentially surrounding casing to minimize steam-path leakage. Springs hold the segments radially inward against surfaces on the casing that establish radial clearance between seal and rotor but allow segments to move radially outward in the event of rotor contact. While labyrinth seals, singly or in combination with brush seals, have proved to be quite reliable, labyrinth seal performance degrades over time as a result of transient events in which the stationary and rotating components interfere, rubbing the labyrinth teeth into a "mushroom" profile and opening the seal clearance.

Accordingly, there is a need in the art for a rotary machine having improved leakage control between stationary and rotating components.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
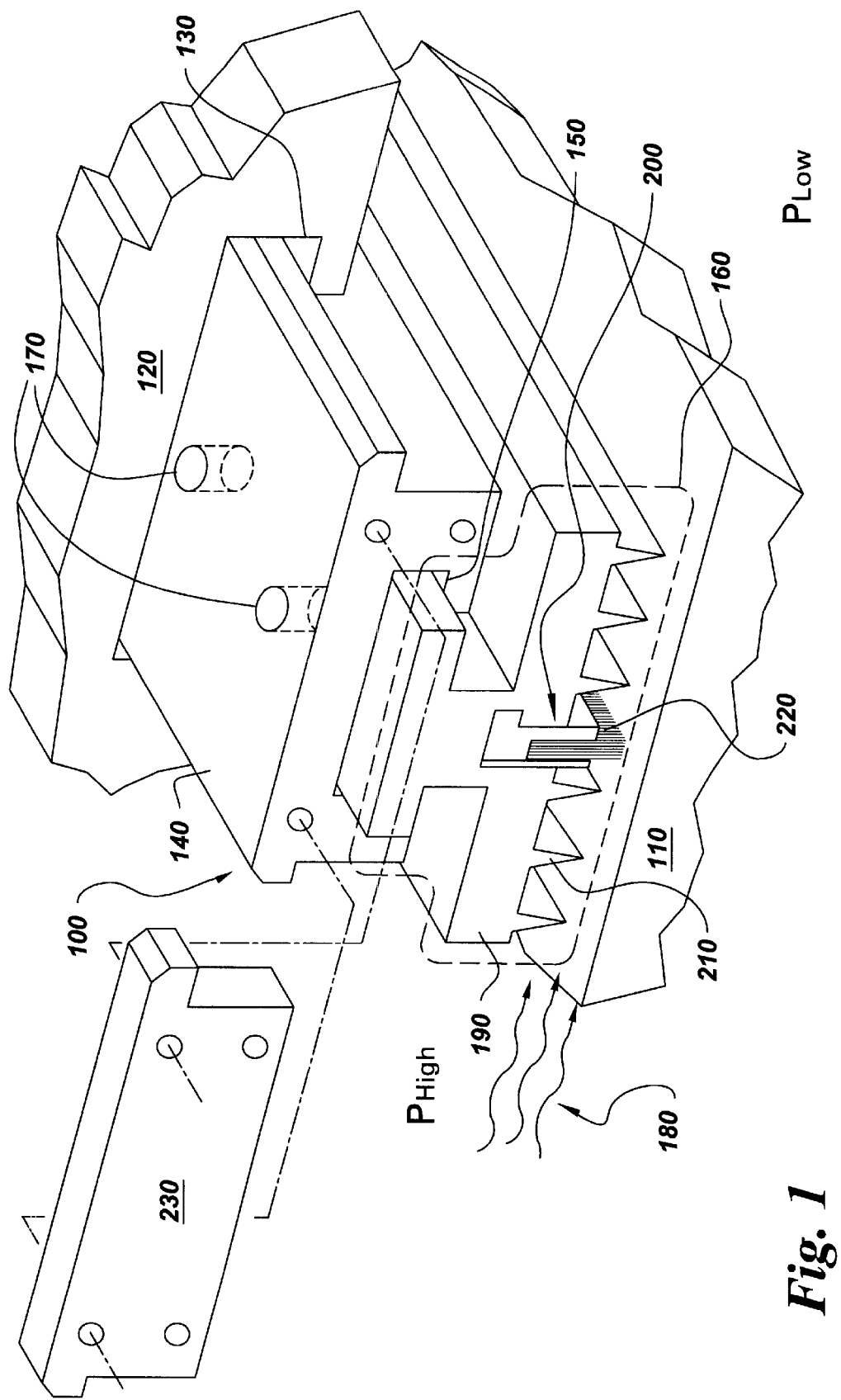
FIG. 1 is a schematic, cross sectional view of a seal assembly in accordance with one embodiment of the present invention.

Referring now to the drawings, FIG. 1 schematically shows a seal assembly 100 for a rotary machine (only a portion of which is shown in the Figure) where the rotary machine comprises a rotor 110, for example a turbine rotor, and a casing 120, for example, a turbine casing. The rotor 110 may, without limitation, be constructed as a single monolithic rotor or as two or more longitudinally-attached rotor segments. The casing 120 may, without limitation, be constructed as a single monolithic casing or a plurality of longitudinally-attached casing segments. The term "rotor" includes a shaft, disk, wheel, and the like. The rotor 110 comprises a generally longitudinally-extending axis, and the casing 120 is generally coaxially aligned with the axis. The casing 120 circumferentially surrounds and is radially spaced apart from the rotor 110. In addition, the casing 120 comprises an inner circumferential channel 130 generally coaxially aligned with the rotor 110.

Figure 2:
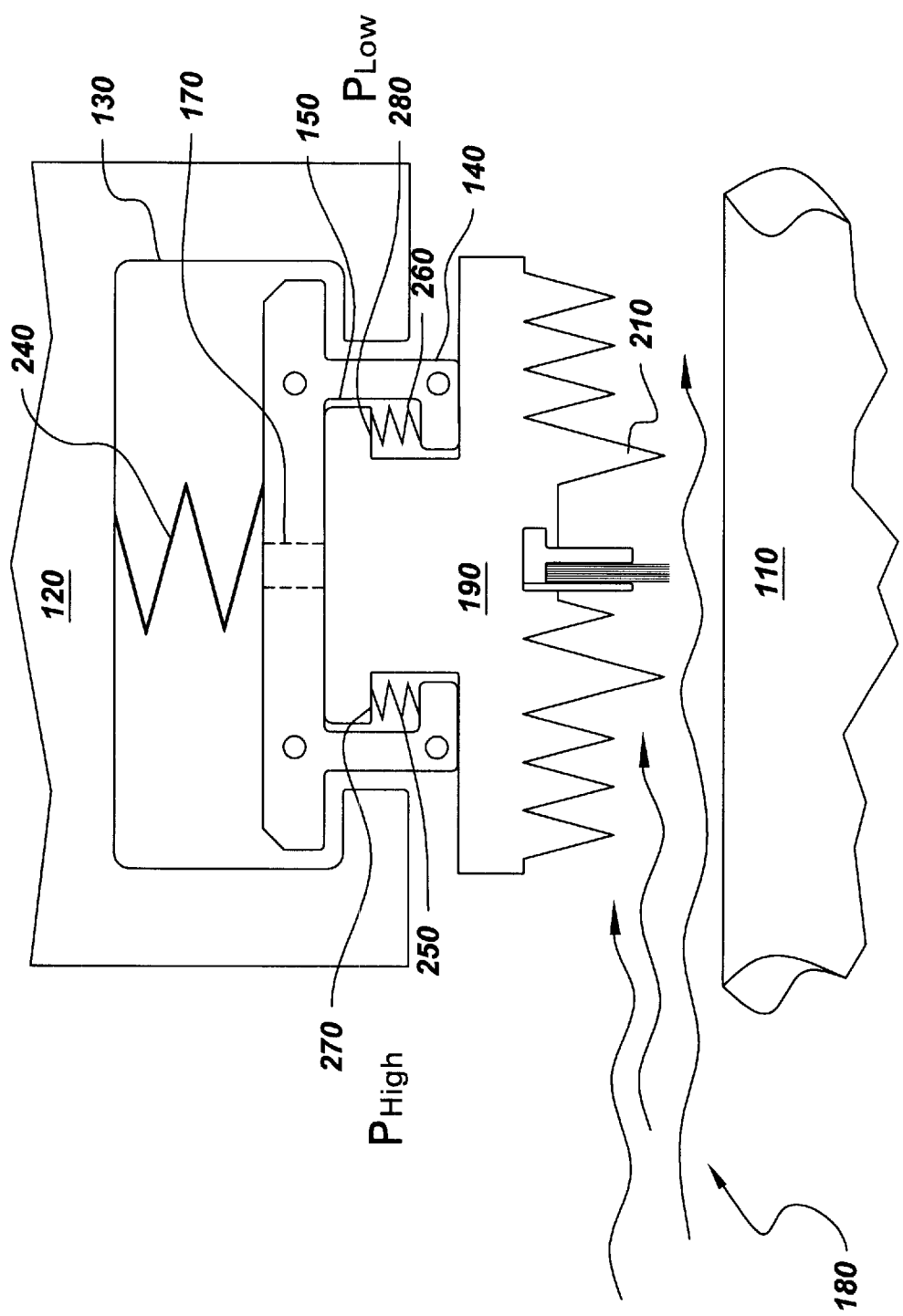
FIG. 2 is a schematic, cross sectional view of the seal assembly of FIG. 1 in an open position.
Figure 3:
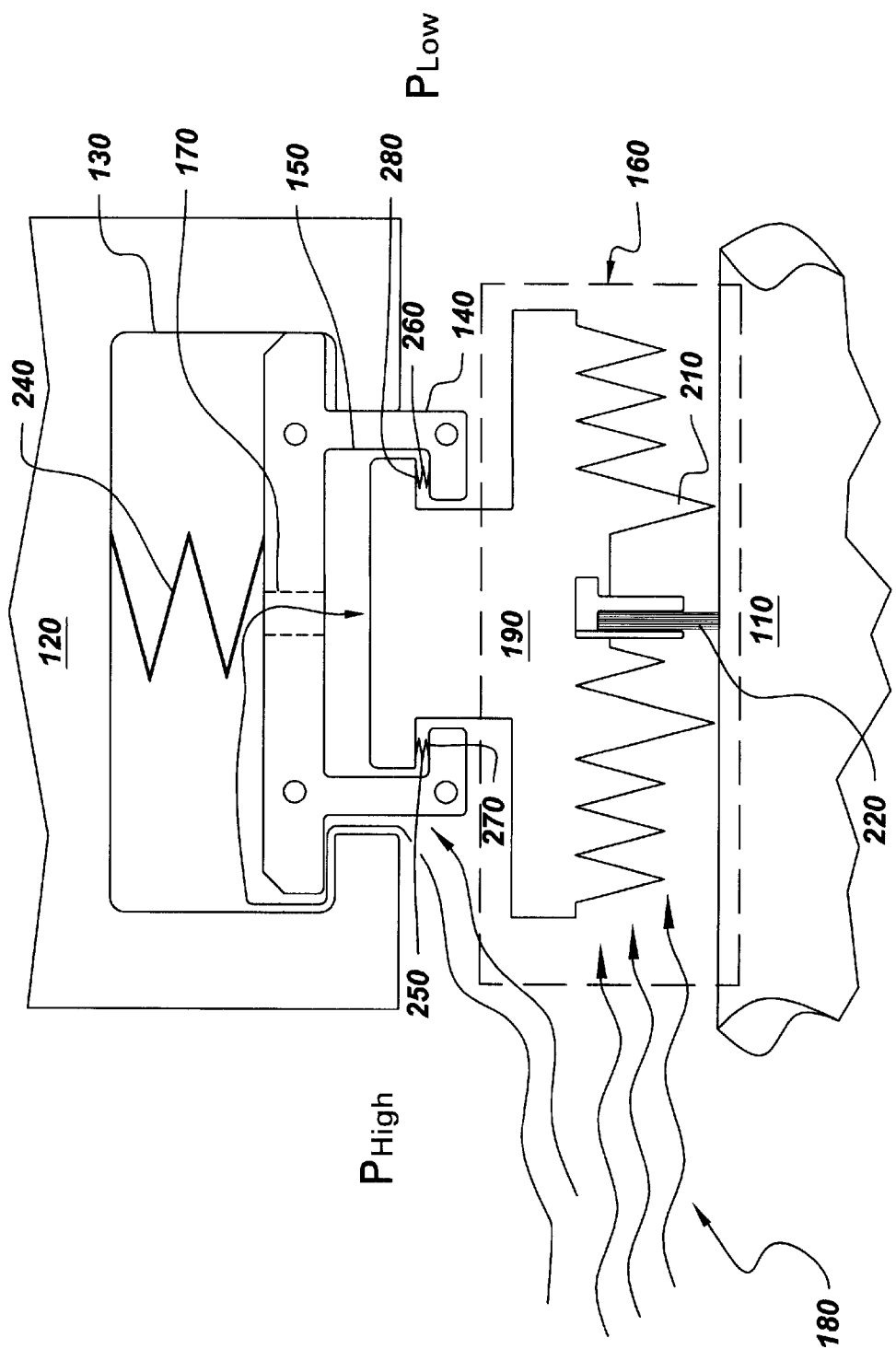
FIG. 3 is a schematic, cross sectional view of the seal assembly of FIG. 1 in a closed position.

Seal assembly 100 comprises a plurality of seal carrier segments 140 fixedly disposed in a circumferential array in the inner circumferential channel 130. Each of the seal carrier segments 140 comprises a seal carrier channel 150 and at least one fluid inlet 170 disposed therein. The term "fixedly", as used herein, refers to the position of seal carrier segments 140 such that the seal carrier segments 140 are firmly positioned once disposed in the rotary machine. In addition, the seal assembly 100 comprises a (meaning at least one) seal 160 where each seal 160 is disposed in a respective seal carrier channel 150 and is movable between a radially inward position, designated the "closed" position (as shown in FIG. 3), and a radially outward position, designated the "open" position (as shown in FIG. 2), upon introduction of a fluid medium 180 in the fluid inlet 170. In operation, each of the seal carrier segments 140 is adapted to allow the fluid medium 180 to flow through the fluid inlet 170 and force the seal 160 radially inward towards the rotor 110 (as shown in FIG. 3). In the closed position the seal carrier segments 140 are closer to the rotor 110 as compared with the open position wherein the seal carrier segments 140 are farther from the rotor 110 (as shown in FIG. 2). It will be appreciated that the seal 160 is selected from the group consisting of brush seals, labyrinth teeth seals, abradable seals, honeycomb seals, leaf seals, finger seals, ceramic seals, aramid seals, aspirating seals and combinations thereof. For illustrative purposes, it will be appreciated that the fluid medium 180 in the fluid path flows from the high pressure side designated "PHI", towards, the low pressure side, designated "PLOW", i.e., from the left to the right of drawing FIG. 3.

Figure 4:
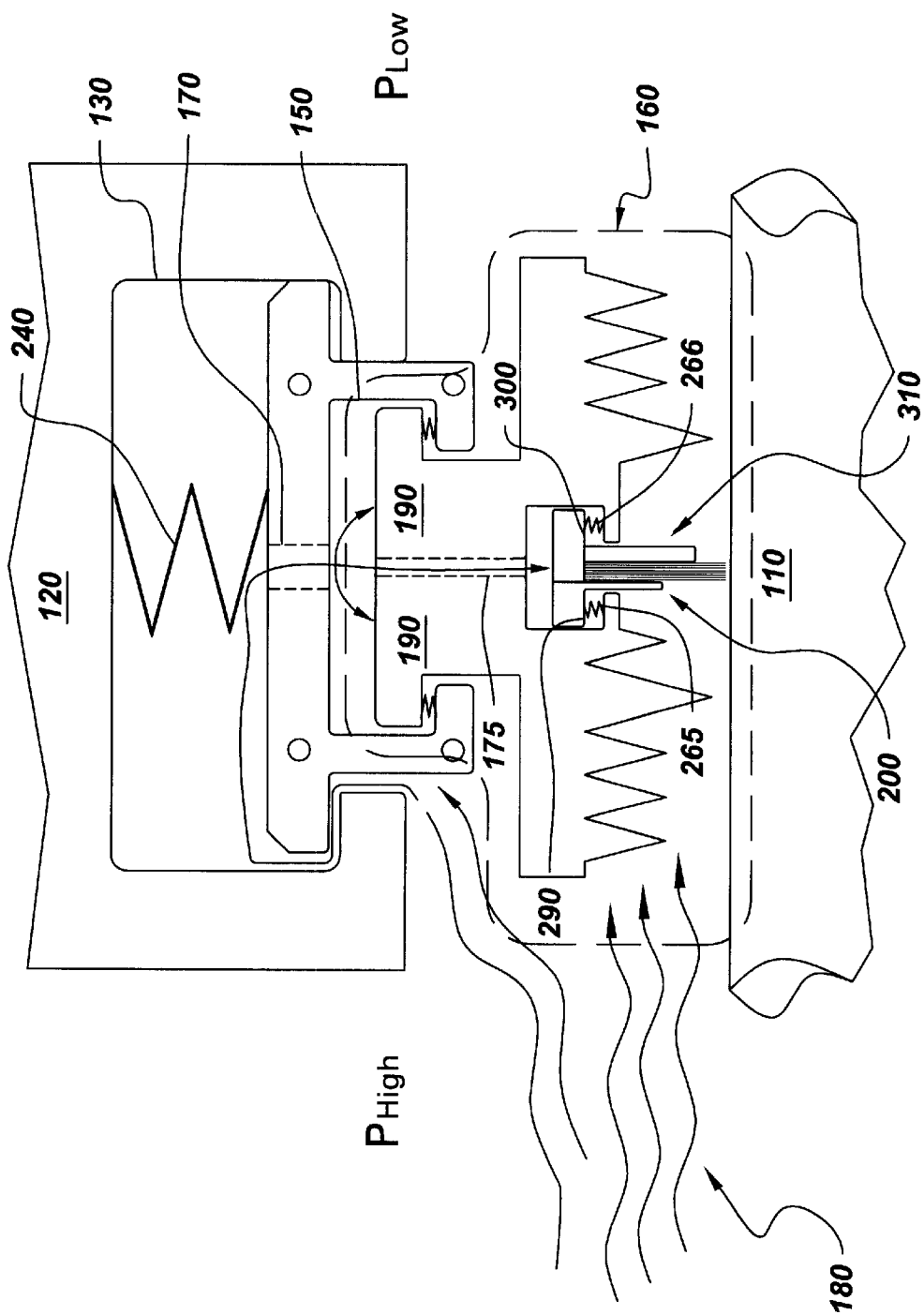
FIG. 4 is a schematic, cross sectional view of a seal assembly in accordance with another embodiment of the present invention.

In one embodiment, the seal 160 comprises a seal fluid inlet 175 configured to allow the fluid medium 180 therethrough and radially actuate a secondary seal 310 disposed therein (see FIG. 4). It will be appreciated that in other embodiments the secondary seal 310 comprises at least one seal 160, singly or in combination, as discussed above. In an exemplary embodiment as shown in FIG. 4, the fluid medium 180 enters fluid inlet 170 forcing a labyrinth teeth seal 190 radially downward. Subsequently, fluid medium 180 enters the seal fluid inlet 175 wherein the fluid medium 180 forces a brush seal 200 radially downward and thereby restricts the flow of fluid medium 180 in the gap defined between the brush seal 200 and the rotor 110. In this embodiment, brush seal springs 265 and 266 are disposed between a brush seal front plate bottom portion 290 and labyrinth teeth seal 190 and disposed between a brush seal back plate bottom portion 300 and labyrinth teeth seal 190 respectively. Here, brush seal springs 265 and 266 force brush seal 200 radially outward so as to provide a gap between the brush seal 200 and the rotor 110. FIG. 4 shows brush seal 200 in a radially downward position where brush seal springs 265 and 266 are radially displaced so as to allow brush seal 200 to be disposed adjacent rotor 110. It will be appreciated that any type of seal 160 and combinations thereof (as described above) may be used in conjunction with brush seal springs 265 and 266.

In another embodiment, seal assembly 100 is disposed in a rotary machine such as an electric generator or, more specifically, a hydrogen cooled electric generator. In a further embodiment, the seal assembly 100 is disposed in turbomachinery such as a centrifugal compressor, a steam turbine, or a gas turbine typically used in aircraft engines or used by power utility companies. It is noted that the invention is not limited to the examples expressed herein and is useful in association with any machine experiencing a pressure drop during machine operation. In addition, the seal assembly 100 is not limited to a moving or rotating portion of the machine and can be employed between two components having no relative motion.

In another embodiment, the seal assembly 100 comprises a plurality of caps 230 where each end of each of the seal carrier segments 140 comprises a respective one of the caps 230 disposed thereon (see FIG. 1). In this embodiment, such caps 230 keep seal 160 secured to each of the seal carrier segments 140. As used herein, directional words such as, for example, "thereon", "therein", "on", "in", "over", "above", and "under" are used to refer to the relative location of elements of seal assembly 100 as illustrated in the Figures and are not meant to be limitations in any manner with respect to the orientation or operation of seal assembly 100. In another embodiment, the positions of the seal carrier segments 140 are fixed during operation of the rotary machine. In one more specific example, a plurality of seal carrier springs 240 each fixedly dispose each of the respective seal carrier segments 140 in the inner circumferential channel 130 (see FIG. 3). In an exemplary embodiment, seal springs 250 and 260 are disposed between labyrinth teeth seal bottom hook portions 270 and 280 respectively and seal carrier segment 140 (see FIG. 2). As shown in FIG. 2, seal springs 250 and 260 force labyrinth teeth seal 190 radially outward so as to provide a gap defined between the labyrinth teeth seal 190 and the rotor 110. For illustrative purposes, the Figures herein show the labyrinth teeth seal 190 in conjunction with brush seal 200; however, it will be appreciated that any type of seal 160 and combinations thereof (as described above) may be used in conjunction with seal springs 250 and 260.

It is known in the art that, during transient events of the rotary machine, keeping the radial distance between the labyrinth teeth seal 190, for example, and the rotor 110 and the radial distance between the brush seal 200, for example, and the rotor 110 protects the teeth 210 and the bristles 220 from damaging contact with a vibrating and oscillating rotor 110. The term "transient events", as used herein, refers to events in the rotary machine during startup and shutdown, for example. In typical steam turbines, when such transient rotor vibrations and oscillations have settled out during steady-state operating conditions, the internal turbine pressure increases thereby causing separate pressure regions on axially opposite sides of seal assembly 100. As such, the internal turbine pressure, shown in the form of the fluid medium 180 in the fluid path in the Figures, is forced between casing 120 and seal carrier segment 140. In addition, in embodiments of the present invention described herein, the fluid medium 180 enters the fluid inlet 170 and thereby forces the seal 160 radially inward towards the rotor 110 (see FIG. 3). As a result, the flow of the fluid medium 180 in the gap defined between the seal 160 and the rotor 110 is restricted and thereby the efficiency of the turbine is increased.

In operation, a method of retrofitting the seal assembly 100 in the turbine comprises disposing the plurality of seal carrier segments 140 in a circumferential array in the inner circumferential channel 130. Each of the seal carrier segments 140 comprises a seal carrier channel 150 and at least one fluid inlet 170 disposed therein. In addition, such method of retrofitting the seal assembly 100 comprises disposing the seal 160 where the seals 160 is disposed in seal carrier channel 150. The seal 160 is movable between radially inward and radially outward positions upon introduction of a fluid medium 180 in the fluid inlet 170. One advantage to such method of retrofitting the seal assembly 100 in the turbine, for example, is that the seal assembly 100 is simply removed and replaced with another seal assembly 100 and down time of the turbine is thereby reduced. In some operations, such method of retrofitting allows a technician to replace seal assembly 100 without having to disassemble any major parts of the rotary machinery thereby reducing repair costs.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A seal assembly for a rotary machine, said rotary machine comprising a rotor and a casing, said rotor comprising a generally longitudinally-extending axis, said casing generally coaxially aligned with said axis, said casing circumferentially surrounding and radially spaced apart from said rotor, said casing comprising an inner circumferential channel generally coaxially aligned with said rotor, and said seal assembly comprising:

a plurality of seal carrier segments fixedly disposed in a circumferential array in said inner circumferential channel, each of said seal carrier segments comprising a seal carrier channel, wherein at least one of said seal carrier segments comprises at least one fluid inlet disposed therein; and a seal disposed in said seal carrier channel and movable between radially inward and radially outward positions upon introduction of a fluid medium in said fluid inlet.

2. The seal assembly of claim 1, wherein said rotary machine is a turbomachine.

3. The seal assembly of claim 1, wherein said seal comprises a plurality of seals.

4. The seal assembly of claim 1, wherein said seal is selected from the group consisting of brush seal bristles, labyrinth teeth seals, abradable seals, honeycomb seals, leaf seals, finger seals, ceramic seals, aramid seals, aspirating seals and combinations thereof.

5. The seal assembly of claim 1, wherein said seal comprises at least one seal fluid inlet configured to allow said fluid medium therethrough and radially actuate a secondary seal disposed within said seal.

6. The seal assembly of claim 5 further comprising at least one brush seal spring disposed between said seal and said secondary seal.

7. The seal assembly of claim 1, further comprising a plurality of caps, each end of each of said seal carrier segments having a respective one of said caps disposed thereon.

8. The seal assembly of claim 1, wherein each of said seal disposed in said seal carrier channel further comprises another seal fluid inlet in fluid communication with said fluid inlet disposed in said seal carrier segments.

9. The seal assembly of claim 1, wherein the positions of said seal carrier segments are fixed during operation of said rotary machine.

10. The seal assembly of claim 1, further comprising a plurality of seal carrier springs in said inner circumferential channel so as to fixedly dispose each of said seal carrier segments in said inner circumferential channel.

11. A turbine comprising:

a turbine rotor comprising a generally longitudinally-extending axis;

a turbine casing generally coaxially aligned with said axis, said casing circumferentially surrounding and radially spaced apart from said rotor, said casing comprising an inner circumferential channel generally coaxially aligned with said rotor;

a plurality of seal carrier segments fixedly disposed in a circumferential array in said inner circumferential channel, each of said seal carrier segments comprising a seal carrier channel, wherein at least one of said seal carrier segments comprises at least one fluid inlet disposed therein; and a seal disposed in said seal carrier channel and movable between radially inward and radially outward positions upon introduction of a fluid medium in said fluid inlet.

12. The turbine of claim 11, wherein said turbine is selected from the group consisting of steam turbines and gas turbines.

13. The turbine of claim 11, wherein said seal is selected from the group consisting of brush seal bristles, labyrinth teeth seals, abradable seals, honeycomb seals, leaf seals, finger seals, ceramic seals, aramid seals, aspirating seals and combinations thereof.

14. The turbine of claim 11, wherein said seal comprises at least one seal fluid inlet configured to allow said fluid medium therethrough and radially actuate a secondary seal disposed within said seal.

15. The turbine of claim 14 further comprising at least one brush seal spring disposed between said seal and said secondary seal.

16. The turbine of claim 11, further comprising a plurality of caps, each end of each of said seal carrier segments having a respective one of said caps disposed thereon.

17. The turbine of claim 11, wherein each of said seal disposed in said seal carrier channel further comprises another seal fluid inlet in fluid communication with said fluid inlet disposed in said seal carrier segments.

18. The turbine of claim 11, wherein the positions of said seal carrier segments are fixed during operation of said turbine.

19. The turbine of claim 11, further comprising a plurality of seal carrier springs in said inner circumferential channel so as to fixedly dispose each of said seal carrier segments in said inner circumferential channel.

20. A method of retrofitting a seal assembly in a turbine, said turbine comprising a turbine rotor and a turbine casing, said rotor comprising a generally longitudinally-extending axis, said casing generally coaxially aligned with said axis, said casing circumferentially surrounding and radially spaced apart from said rotor, said casing comprising an inner circumferential channel generally coaxially aligned with said rotor, and said method of retrofitting comprising:

disposing a plurality of seal carrier segments in a circumferential array in said inner circumferential channel, each of said seal carrier segments comprising a seal carrier channel, wherein at least one of said seal carrier segments comprises at least one fluid inlet disposed therein; and disposing a seal disposed in said seal carrier channel and movable between radially inward and radially outward positions upon introduction of a fluid medium in said fluid inlet.

21. The method of claim 20, wherein said turbine is selected from the group consisting of steam turbines and gas turbines.

22. The method of claim 20, wherein said seal comprises at least one seal fluid inlet configured to allow said fluid medium therethrough and radially actuate a secondary seal disposed within said seal.

23. The method of claim 22 further comprising disposing at least one brush seal spring between said seal and said secondary seal.

24. The method of claim 20 further comprising a plurality of caps, each end of each of said seal carrier segments having a respective one of said caps disposed thereon.

25. The method of claim 20, wherein each of said seal disposed in said seal carrier channel further comprises another seal fluid inlet in fluid communication with said fluid inlet disposed in said seal carrier segments.

26. The method of claim 20, wherein the positions of said seal carrier segments are fixed during operation of said turbine.

27. The method of claim 20 further comprising disposing a plurality of seal carrier springs in said inner circumferential channel so as to fixedly dispose each of said seal carrier segments in said inner circumferential channel.

* * * * *